US012017942B2

(12) United States Patent
Harrington et al.

(10) Patent No.: US 12,017,942 B2
(45) Date of Patent: Jun. 25, 2024

(54) WATER CONDITIONING SYSTEMS

(71) Applicant: Unger Marketing International, LLC, Bridgeport, CT (US)

(72) Inventors: William Harrington, Newtown, CT (US); Kai Hirsch, Cologne (DE); Stephen P. Huda, Shelton, CT (US); Michael Stockfleit, Duisburg (DE); Adrian Haag, Solingen (DE)

(73) Assignee: Unger Marketing International, LLC, Bridgeport, CT (US)

( * ) Notice: Subject to any disclaimer, the term of this patent is extended or adjusted under 35 U.S.C. 154(b) by 192 days.

(21) Appl. No.: 17/085,029

(22) Filed: Oct. 30, 2020

(65) Prior Publication Data
US 2021/0047222 A1 Feb. 18, 2021

Related U.S. Application Data

(63) Continuation-in-part of application No. 15/809,069, filed on Nov. 10, 2017, now abandoned, which is a
(Continued)

(51) Int. Cl.
*C02F 9/00* (2023.01)
*B08B 13/00* (2006.01)
(Continued)

(52) U.S. Cl.
CPC ............... *C02F 9/20* (2023.01); *B08B 13/00* (2013.01); *C02F 1/283* (2013.01); *C02F 1/42* (2013.01);
(Continued)

(58) Field of Classification Search
CPC .. B08B 3/026; B08B 3/00; B08B 3/08; B08B 3/10; B08B 3/02; B08B 1/002;
(Continued)

(56) References Cited

U.S. PATENT DOCUMENTS 3,774,763 A 11/1973 Yall et al.
4,119,517 A 10/1978 Hengst
(Continued)

FOREIGN PATENT DOCUMENTS

CN 203486997 3/2014
EP 0331136 9/1989
(Continued)

*Primary Examiner* — Akash K Varma
(74) *Attorney, Agent, or Firm* — McCarter & English, LLP

(57) ABSTRACT

Water conditioning systems are shown and described. The water conditioning systems include a water conditioner having a plurality of conditioning stages along a flow path between an inlet and an outlet that are configured to condition water. The plurality of conditioning stages include a pre-filter stage, a feed pump, a reverse osmosis stage, and a post-filter stage. A pure water valve is arranged between the feed pump and the reverse osmosis stage and a boost valve is arranged between the feed pump and the outlet. The pure water valve is configured to selectively allow water to flow from the feed pump, through the reverse osmosis stage and the post-filter stage, prior to exiting through the outlet, and the boost valve is configured to selectively allow water to flow from the boost pump directly to the outlet and bypassing the reverse osmosis stage and the post-filter.

25 Claims, 4 Drawing Sheets

Related U.S. Application Data continuation of application No. PCT/US2016/032554, filed on May 13, 2016.

(60) Provisional application No. 62/254,448, filed on Nov. 12, 2015, provisional application No. 62/160,832, filed on May 13, 2015.

(51) Int. Cl.
| | |
|---|---|
| *C02F 1/28* | (2023.01) |
| *C02F 1/42* | (2023.01) |
| *C02F 1/44* | (2023.01) |
| *C02F 9/20* | (2023.01) |
| *C02F 103/02* | (2006.01) |

(52) U.S. Cl.
CPC .............. *C02F 1/441* (2013.01); *C02F 1/442* (2013.01); *C02F 2103/02* (2013.01); *C02F 2201/008* (2013.01); *C02F 2301/043* (2013.01)

(58) Field of Classification Search
CPC ..... B08B 1/00; B08B 2203/0217; B08B 7/04; B08B 13/00; C02F 1/008; C02F 1/32; C02F 1/42; C02F 1/76; C02F 1/00; C02F 1/283; C02F 1/441; C02F 1/442; C02F 1/001; C02F 1/444; C02F 1/44; C02F 1/28; C02F 9/005; C02F 9/00; C02F 2103/02; C02F 2103/04; C02F 2201/008; C02F 2201/005; C02F 2301/043; C02F 2209/008; C02F 2209/03; C02F 2209/10; A47L 1/02
USPC .......................................................... 210/141
See application file for complete search history.

(56) References Cited

U.S. PATENT DOCUMENTS

| | | | |
|---|---|---|---|
| 4,230,579 A | 10/1980 | Bray | |
| 4,722,128 A | 2/1988 | Keller | |
| 4,801,375 A | 1/1989 | Padilla | |
| 4,836,923 A | 6/1989 | Popoff | |
| 4,967,960 A * | 11/1990 | Futrell | B08B 3/026 |
| | | | 239/305 |
| 4,988,427 A | 1/1991 | Wright | |
| 5,085,769 A | 2/1992 | Klausen et al. | |
| 5,399,260 A | 3/1995 | Eldredge et al. | |
| 5,503,735 A | 4/1996 | Vinas et al. | |
| 5,547,584 A | 8/1996 | Capehart | |
| 6,027,642 A | 2/2000 | Prince et al. | |
| 6,228,255 B1 | 5/2001 | Peterson et al. | |
| 6,273,126 B1 | 8/2001 | Shen | |
| 6,372,132 B1 | 4/2002 | Williams | |
| 6,824,695 B2 | 11/2004 | Tempest, Jr. | |
| 7,100,427 B2 | 9/2006 | Kahn et al. | |
| 7,104,115 B2 | 9/2006 | Kahn et al. | |
| 7,237,682 B2 | 7/2007 | Reynolds et al. | |
| 7,249,000 B2 | 7/2007 | Kahn et al. | |
| 7,632,410 B2 | 12/2009 | Heiss | |
| 7,908,724 B2 | 3/2011 | Isabelle | |
| 7,955,503 B2 | 6/2011 | Onota et al. | |
| 8,469,331 B2 | 6/2013 | Burbank et al. | |
| 8,486,275 B2 | 7/2013 | Wolf | |
| 8,529,770 B2 | 9/2013 | Yencho | |
| 8,900,459 B2 | 12/2014 | Tenne | |
| 10,549,239 B2 | 2/2020 | Hirach et al. | |
| 10,717,046 B2 | 7/2020 | Adams et al. | |
| 2003/0024870 A1 | 2/2003 | Reinhart | |
| 2003/0127119 A1 * | 7/2003 | Scordo | B60S 3/04 |
| | | | 134/123 |
| 2003/0196947 A1 | 10/2003 | Gundrum et al. | |
| 2003/0230522 A1 * | 12/2003 | Pavel | B01D 61/04 |
| | | | 210/259 |
| 2005/0016906 A1 | 1/2005 | Gettman | |
| 2007/0045165 A1 | 3/2007 | Beall | |
| 2007/0009059 A1 | 4/2007 | Plummer et al. | |
| 2009/0008318 A1 | 1/2009 | Anes et al. | |
| 2009/0182263 A1 | 7/2009 | Burbank et al. | |
| 2009/0211605 A1 * | 8/2009 | Ahmad | B60S 1/528 |
| | | | 134/123 |
| 2010/0109601 A1 | 5/2010 | Coyle et al. | |
| 2010/0140095 A1 | 6/2010 | Telepciak et al. | |
| 2012/0284982 A1 | 11/2012 | Chen et al. | |
| 2013/0126430 A1 | 5/2013 | Kenley et al. | |
| 2014/0083846 A1 | 3/2014 | Moon et al. | |
| 2015/0336820 A1 | 11/2015 | Grabosch et al. | |
| 2017/0136412 A1 | 5/2017 | Huda | |
| 2017/0137303 A1 | 5/2017 | Hirsch et al. | |
| 2017/0137304 A1 | 5/2017 | Adams et al. | |
| 2020/0147549 A1 | 5/2020 | Hirsch et al. | |
| 2020/0384413 A1 | 12/2020 | Adams et al. | |

FOREIGN PATENT DOCUMENTS

| | | |
|---|---|---|
| EP | 0352779 A2 | 1/1990 |
| IN | 204103914 | 1/2015 |
| WO | 02100780 | 12/2002 |
| WO | 2007018561 A1 | 2/2007 |
| WO | 2008131546 A1 | 11/2008 |
| WO | 2014110074 | 7/2014 |
| WO | 2015157680 A1 | 10/2015 |

* cited by examiner

WATER CONDITIONING SYSTEMS

CROSS REFERENCE TO RELATED APPLICATIONS

This application is continuation-in-part Application of U.S. application Ser. No. 15/809,069, filed on Nov. 10, 2017, which claims the benefit of U.S. Application Ser. No. 62/160,832, filed on May 13, 2015 and U.S. Application Ser. No. 62/254,448, filed on Nov. 12, 2015. U.S. application Ser. No. 15/809,069, is also a continuation application of International Application No. PCT/US2016/032554, filed on May 13, 2016. The entire contents of the priority applications listed herein are incorporated by reference.

BACKGROUND

Field of the Disclosure

The present disclosure is related to water conditioning systems. More particularly, the present disclosure is related to portable water conditioning systems having improved operational features.

2. Description of Related Art

Water conditioners that condition incoming water (e.g., tap water) for use in one or more cleaning tasks are known. As used herein, the term "conditioned water" shall mean water that has been filtered, (distilled), deionized, demineralized (e.g., via reverse osmosis), softened, anti-scaled, exposed to any other water treatment process—including the addition of one or more additives or components, and any combinations thereof.

However, it has been determined by the present disclosure that there is a need for water conditioning systems that provide feedback to an operator and/or improved operational modes. The present disclosure is directed to water conditioning systems that provide enhanced utility and ease of use as compared to prior art water conditioners.

SUMMARY

According to some embodiments, water conditioning systems are provided. The water conditioning systems include a water conditioner having a plurality of conditioning stages arranged along a flow path between an inlet and an outlet and configured to condition water, the plurality of conditioning stages comprising, in a direction of flow along the flow path, a pre-filter stage, a feed pump, a reverse osmosis stage, and a post-filter stage; a pure water valve arranged between the feed pump and the reverse osmosis stage; and a boost valve arranged between the feed pump and the outlet, wherein the pure water valve is configured to selectively allow water to flow from the feed pump, through the reverse osmosis stage and the post-filter stage, prior to exiting through the outlet, and wherein the boost valve is configured to selectively allow water to flow from the boost pump directly to the outlet and bypassing the reverse osmosis stage and the post-filter stage.

In addition to one or more of the features described above, or as an alternative, further embodiments of the water conditioning systems may include a one-way valve arranged between the post-filter stage and the outlet.

In addition to one or more of the features described above, or as an alternative, further embodiments of the water conditioning systems may include a water counter arranged between the pre-filter stage and the feed pump.

In addition to one or more of the features described above, or as an alternative, further embodiments of the water conditioning systems may include a pump control arranged downstream from both the boost valve and the post-filter stage.

In addition to one or more of the features described above, or as an alternative, further embodiments of the water conditioning systems may include a total dissolved solids sensor arranged just before the outlet along the flow path.

In addition to one or more of the features described above, or as an alternative, further embodiments of the water conditioning systems may include that, when the pure water valve is open and the boost valve is closed, treated water is dispensed from the outlet having a rate of 300 liters per hour or less.

In addition to one or more of the features described above, or as an alternative, further embodiments of the water conditioning systems may include that the treated water has a pressure of 4 bar or less.

In addition to one or more of the features described above, or as an alternative, further embodiments of the water conditioning systems may include that, when the boost valve is open and the pure water valve is closed, treated water is dispensed from the outlet having a rate of 600 liters per hour or greater.

In addition to one or more of the features described above, or as an alternative, further embodiments of the water conditioning systems may include that the treated water has a pressure of 6 bar or greater.

In addition to one or more of the features described above, or as an alternative, further embodiments of the water conditioning systems may include that the pre-filter stage comprises a sediment and carbon pre-filter.

In addition to one or more of the features described above, or as an alternative, further embodiments of the water conditioning systems may include that the reverse osmosis stage comprises at least one of a reverse osmosis membrane and a nano filtration membrane.

In addition to one or more of the features described above, or as an alternative, further embodiments of the water conditioning systems may include that the post-filter comprises a deionization polisher.

In addition to one or more of the features described above, or as an alternative, further embodiments of the water conditioning systems may include a switch configured to selectively control operation of the pure water valve and the boost valve.

In addition to one or more of the features described above, or as an alternative, further embodiments of the water conditioning systems may include that the switch is at least one of an electronic switch, a mechanical switch, and an electromechanical switch.

In addition to one or more of the features described above, or as an alternative, further embodiments of the water conditioning systems may include a remote-control device configured to control at least one of an on/off state of the water conditioning system and a boost/pure water operation of the water conditioning system.

In addition to one or more of the features described above, or as an alternative, further embodiments of the water conditioning systems may include that the remote-control device is configured to wired or wirelessly communicate with a received on the water conditioning system.

In addition to one or more of the features described above, or as an alternative, further embodiments of the water conditioning systems may include a cleaning implement operably connected to the water conditioner to receive treated water therefrom.

In addition to one or more of the features described above, or as an alternative, further embodiments of the water conditioning systems may include an indicator element on the cleaning implement, wherein the indicator element is configured to generate a notification associated with the treated water.

In addition to one or more of the features described above, or as an alternative, further embodiments of the water conditioning systems may include that the indicator element is one of a light, a speaker, and a haptic feedback device.

In addition to one or more of the features described above, or as an alternative, further embodiments of the water conditioning systems may include that the cleaning implement is a water-fed pole.

In addition to one or more of the features described above, or as an alternative, further embodiments of the water conditioning systems may include that the cleaning implement comprises an extendable pole.

In addition to one or more of the features described above, or as an alternative, further embodiments of the water conditioning systems may include an indicator element configured to generate a notification associated with the treated water.

In addition to one or more of the features described above, or as an alternative, further embodiments of the water conditioning systems may include that the indicator element is part of a remote-control device.

The above-described and other features and advantages of the present disclosure will be appreciated and understood by those skilled in the art from the following detailed description, drawings, and appended claims.

DESCRIPTION OF THE DRAWINGS

The patent or application file contains at least one photograph executed in color. Copies of this patent or patent application publication with color drawing(s) will be provided by the Office upon request and payment of the necessary fee.

DETAILED DESCRIPTION

Figure 1:
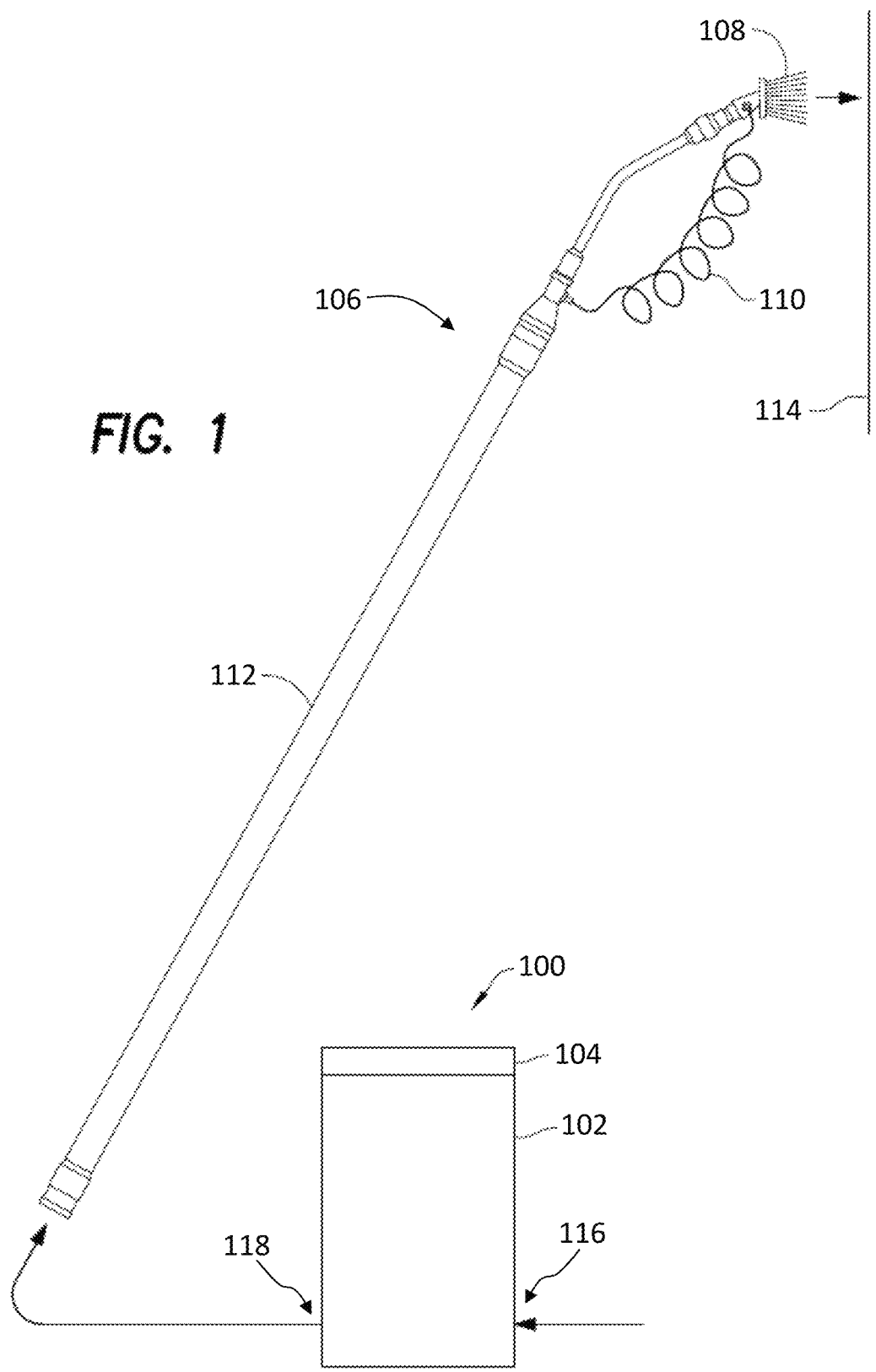
FIG. 1 is a schematic depiction of an embodiment of a water conditioning system according to the present disclosure in use with a water fed cleaning brush on an extension pole.

Referring to FIG. 1, an exemplary embodiment of a water conditioning system 100 according to the present disclosure is shown. The water conditioning system 100 includes a water conditioner 102 in communication with a controller 104. The controller 104 may be configured to provide an operator with information regarding the performance of the conditioner 102 and/or other aspects of the water conditioning system 100. Such information can allow the operator to operate the water conditioning system 100 in a manner that maximizes or optimizes the utilization of a filter media in the conditioner 102 and/or reduce operational costs. The water conditioning system 100 may be configured as a portable or semi-portable system that may be manually moved around by an operator. In some embodiments, the water conditioning system 100 may include wheels or the like to allow hand movement (pulling, dragging, pushing, pivoting, etc.).

The conditioner 102 is shown by way of example in fluid communication with a cleaning implement 106. The cleaning implement 106, as shown, includes a cleaning brush 108 which may be supplied with water from the conditioner 102 via one or more fluid conduits 110. As such, in some configurations, the cleaning brush 108 may be a water-fed cleaning brush. The cleaning brush 108 may be secured to an extension pole 112 which may include a hollow interior for conveying fluids therethrough, such as within the pole itself or through a conduit/hose installed therein or arranged along an outside of the pole 112. The pole 112 and the fluid conduits 110 may be arranged to deliver conditioned water from the conditioner 102 to the cleaning brush 108 to clean a surface 114. The surface 114 may be a building surface, the ground, a window, solar panels, and the like, as will be appreciated by those of skill in the art. Although shown and illustrated with a water-fed pole system, it will be appreciated that the water conditioning system 100 may be used to supply conditioned water for any desired purpose. In some embodiments, the water conditioning system 100 may be configured as a light-weight and compact-size system that can be easily transported in vans, cars, pick-up trucks, and the like. In some embodiment, the water conditioning system 100 may be provided on or as part of a cart for mobility around a work site.

As shown, the water conditioning system 100 may receive water at an inlet 116. The water may then flow through the water conditioning system 100 to be conditioned by the conditioner 102 and exit through an outlet 118. The conditioned water that exits the water conditioning system 100 may past through a fluid conduit, such as a hose or the like, and enter the cleaning implement 106. In some embodiments, the conditioned water may pass through an interior of the pole 112, the fluid conduit 110, and be dispensed through, in, or around, the cleaning brush 108 to be applied to the surface 114.

As discussed above, "conditioned water" means water that has been filtered, deionized, demineralized, softened, exposed any other water treatment process—including the addition of one or more additives or components, and any combinations thereof. To achieve one or more aspects of conditioning of water, the conditioner 102 may include any filter media sufficient to provide an output of water a desired conditioned level. For example, the conditioner 102 can include filter media such as, but not limited to, particle filters, chlorine filters (e.g., activated carbon), ion removers (e.g., deionization resin, reverse osmosis membrane, and/or a nano filtration membrane), UV sterilizers, and any combinations thereof. Particle filtration, as employed herein, and as used in view of the conditioner 102 is a particle filtration to be sufficient for any desired filtration level such as, but not limited to, nano-filtration, ultra-filtration, micro-filtration, and others.

Regarding the addition of one or more additives or chemicals, it is contemplated by the present disclosure for the conditioner 102 to add the additives or chemicals via injection into a flow stream of water as it passes through the water conditioning system 100. Alternative mechanisms may be by drawing the additives or chemicals into the flow stream, mixing or dissolving into the flow stream, and any other additive method. Moreover, it is contemplated for the water conditioning system 100 to add the additives before or after the water passes through the conditioner 102. It is contemplated for the additives to be added automatically or selectively by an operator, with the selective addition being possible via the controller 104 (e.g., by touch buttons, switches, and/or using a remote device such as a remote control or mobile device application). In some embodiments, the water conditioning system 100 may be configured to heat, cool, or otherwise modify or treat the water beyond filtration and chemicals. By of example, the water conditioning system 100 can be configured to condition the water by adding, before or after the conditioner 102, an additive such as, but not limited to, a general purpose cleaning agent, muric acid, a sealer agent, a protectant, bleach, vinegar, an anti-mold agent, an antibacterial agent, a nanotechnology agent, combinations of the foregoing, and others.

By way of example, in some embodiments, the conditioner 102 can be a pure water system as shown and described in Applicant's own U.S. Pat. No. 10,414,671, issued on Sep. 17, 2019, the contents of which are incorporated in their entirety herein. In some embodiments, the conditioner 102 can also include a system as shown and described in Applicant's own U.S. application Ser. No. 15/809,069, filed on Nov. 10, 2017, the contents of which are incorporated in their entirety herein.

Figure 2:
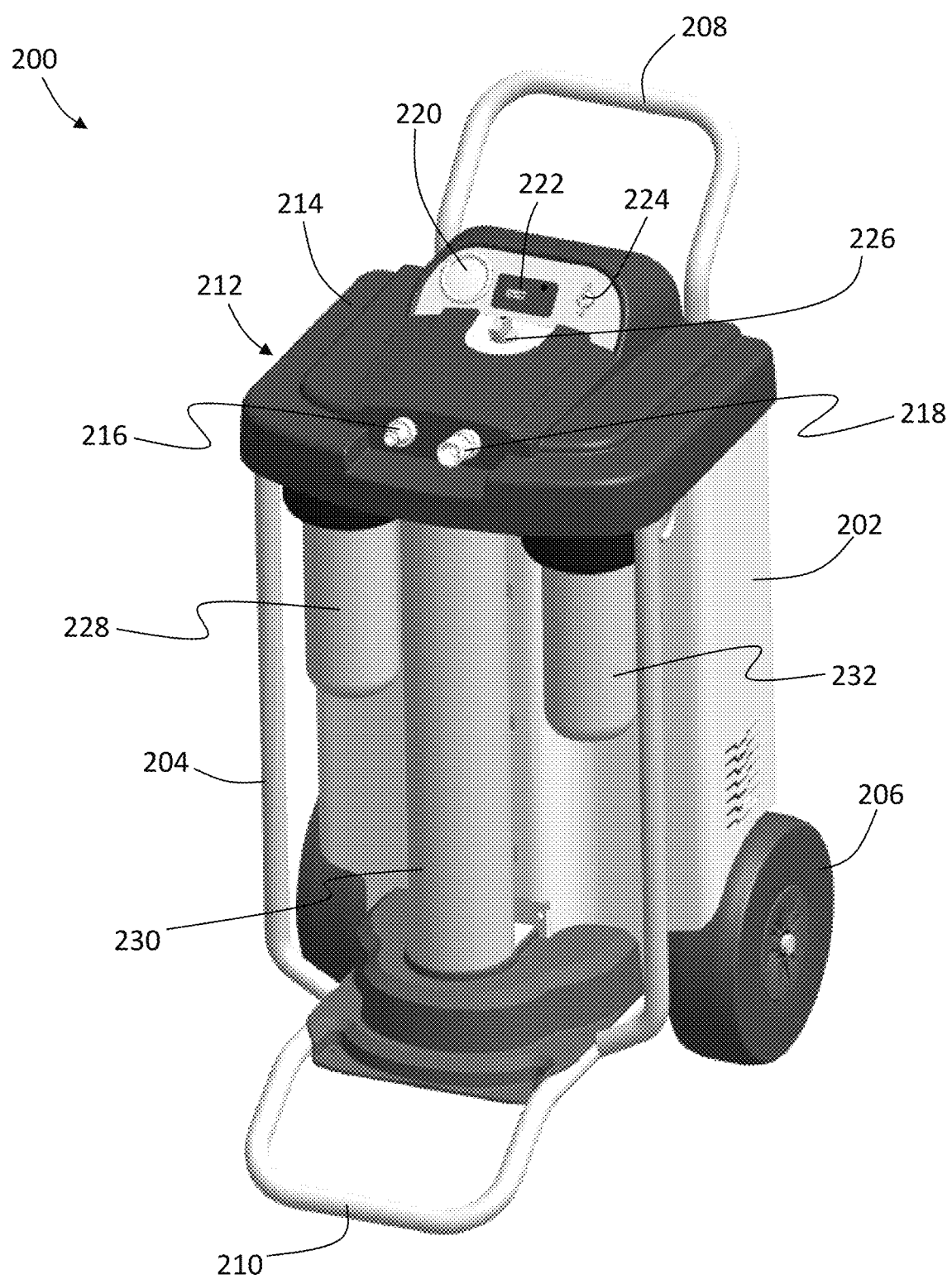
FIG. 2 is a schematic illustration of a water conditioning system in accordance with an embodiment of the present disclosure.

Turning now to FIG. 2, a schematic illustration of a water conditioning system 200 in accordance with an embodiment of the present disclosure is shown. The water conditioning system 200 may be used with a handheld device, such as a cleaning implement shown and described above with respect to FIG. 1. In other uses, the water conditioning system 200 may be used to generate conditioned water for various purposes, as will be appreciated by those of skill in the art.

The water conditioning system 200 is configured as a mobile unit or system that includes a housing 202, a frame 204, and wheels 206 mounted to the frame 204. The frame 204 includes handles 208, 210 which may be used for manual movement of the water conditioning system 200. In some embodiments, one or both of the handles 208, 210 may be arranged to define a support feature for stability and/or contact with the ground or other surface. The handles 208, 210 can enable tilting or rotation of the water conditioning system 200 about an axel to which the wheels 206 are mounted. Accordingly, the water conditioning system 200 may be rotated or tiled from the orientation shown to its backside to provide access to various components of the water conditioning system 200.

The water conditioning system 200 includes a controller 212. The controller 212 comprises a number of components and features that enable control and operation of the water conditioning system 200. The controller 212 can include various electronic components such as displays, processors, electronic switches, mechanical switches, electromechanical switches, electronic and/or magnetic valves, motors, pumps, and the like. In this illustrative embodiment, the controller 212 is at least partially embedded within a cover 214 that is mounted to the frame 204. The controller 212, in this embodiment, includes an inlet 216 and an outlet 218 arranged within the cover 214. The inlet 216 and the outlet 218 are fluidly connected by one or more fluid flow paths within the water conditioning system 200. A such, water can enter the water conditioning system 200 through the inlet 216 and exit the water conditioning system 200 through the outlet 218.

The controller 212 includes one or more control elements, such as buttons, switches, valves, levers, touch pads, and the like, and/or one or more indicators for presenting information to an operator. For example, in this illustrative embodiment, the controller 212 includes a pressure dial 220, a display 222, a purge switch 224, and a bypass switch 226. The pressure dial 220 may display a pressure value of a fluid (e.g., water) within the water conditioning system 200. The display 222, in some configurations, may be provided to display an amount of total dissolved solids (TDS) within the fluid within the water conditioning system 200. In other configurations, or in combination therewith, the display 222 may be configured to display other information related to the water conditioning system 200 and/or water treated therein. The purge switch 224 may be configured to activate a purge operation to clean or clear the water conditioning system 200 after use to ensure that no standing water remains within the water conditioning system 200. The bypass switch 226 may be provided to control operation of a bypass flow path such that incoming water may bypass one or more of the water conditioning elements of the water conditioning system 200.

The water conditioning system 200 includes one or more water conditioning elements. For example, as shown in FIG. 2, the water conditioning system 200 includes a pre-filter stage 228, a membrane 230, and a polisher 232. The pre-filter stage 228, in some embodiments, may be a sediment and carbon filter configured to remove particulates within an incoming water from the inlet 216 (e.g., tap water). The membrane 230 may be a canister-type membrane configured to perform reverse osmosis on the incoming water, typically after passing through the pre-filter stage 228. The membrane 230 may be a nano filtration membrane, for example. The polisher 232 may be a deionization polisher configured to perform a polishing conditioning operation on the water after it passes through the membrane 230. Subsequently, the treated water may be dispensed from the outlet 218 and supplied into a tube, hose, or otherwise dispensed for use by an operator of the water conditioning system 200.

As shown in FIG. 2, the pre-filter stage 228, the membrane 230, and the polisher 232 are configured as canister-type components. Each of the pre-filter stage 228, the membrane 230, and the polisher 232 are removably attachable to the water conditioning system 200. Accordingly, each of the pre-filter stage 228, the membrane 230, and the polisher 232 may be removed and/or exchanged. The arrangement of the water conditioning system 200 enables ease of access and ease of maintenance/exchange of components of the water conditioning system 200. For example, the frame 204 is arranged such that the components are supported and can be rotated about the axel of the wheels 206. When the water conditioning system 200 is resting on the handle 208 and the canister-type components 228, 230, 232 are facing upward, an operator may have an easy and low effort task of exchanging and/or installing the canister-type components 228, 230, 232.

The canister-type components 228, 230, 232 may engage with the controller 212 and have fluid connection with a fluid path through the water conditioning system 200. The engagement may be by twist connection, snap-connection, pin-and-slot connection, or any other type of connection.

Figure 3:
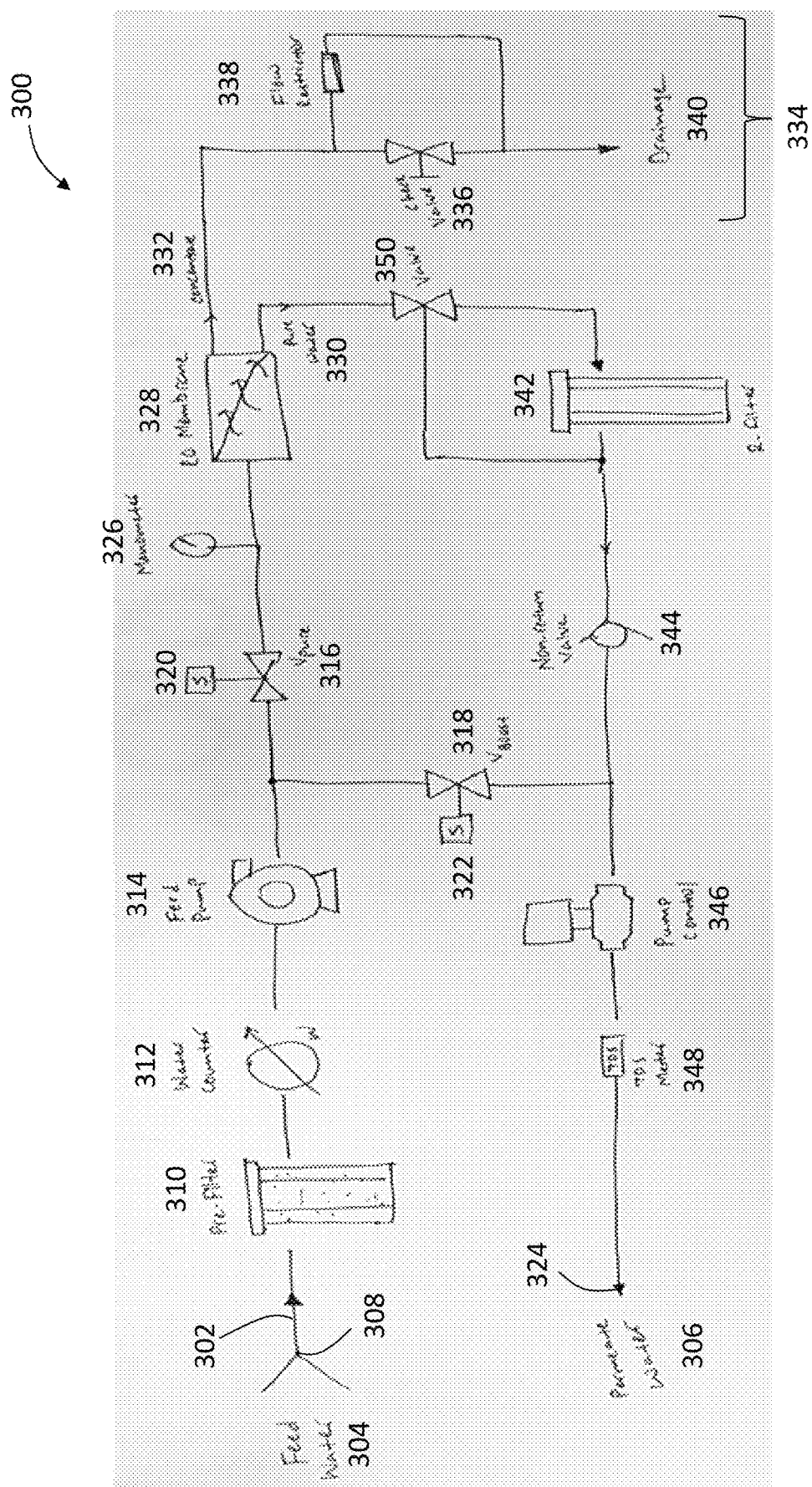
FIG. 3 is a flow diagram of a flow path through a water conditioning system in accordance with an embodiment of the present disclosure.

Turning now to FIG. 3, a schematic diagram of a water conditioning system 300 in accordance with an embodiment of the present disclosure is shown. The water conditioning system 300, for example and without limitation, may have a physical structure similar to that shown and described with respect to FIGS. 1-2. The schematic diagram of FIG. 3 illustrates a flow path 302 of feed water 304 passing through the water conditioning system 300. The flow path 303 is configured to enable generation of treated water 304 to be dispensed from the water conditioning system 300. The treated water 304 may be fully processed, pure water or may be a filtered water, as described herein.

The feed water 304 may be provided from any water source, such as tap water, water from a holding tank, or the like. The water conditioning system 300 is configured to treat the feed water 304. The dispensed treated water 304 may be used for cleaning surfaces, such as windows, buildings, solar panels, and the like. In some configurations, the dispensed treated water 304 may be supplied into a water-fed pole for window washing.

The feed water 304 enters the flow path 302 at an inlet 308. The incoming feed water 304 will be initially, and optionally, treated with a pre-filter stage 310. The pre-filter stage 310 may be configured to remove certain suspended particles and/or chemicals, such as particles, sediment, dirt, dust, rust, carbon, chlorine, and the like. The pre-filtered water is then monitored by a water counter 312, such as a water meter or flow sensor. A feed pump 314 is arranged to increase a pressure of the water along the flow path 302 to ensure sufficiently pressurized water is provided throughout the water conditioning system 300. In this illustrative configuration, the water is then sent either through a pure water valve 316 or a boost valve 318, depending on the operation set for the water conditioning system 300. The valves 316, 318 may be electronic, mechanical, and/or electromechanical, as will be appreciated by those of skill in the art. The pure water valve 316 may be controlled by a first switch 320 and the boost valve 318 may be controlled by a second switch 322. The first and second switches 320, 322 may be manually and/or electronically controlled by a user of the water conditioning system 300. In some embodiments, the first and second switches 320, 322 are controlled by a single mechanical, electromechanical, or electronic element (e.g., bypass switch 226 shown in FIG. 2). That is, in a single switch can cause operation of both of the pure water valve 316 and the boost valve 318 to control flow direction of the flow path 302 through the water conditioning system 300. As shown, the feed pump 314 is arranged upstream of both of the pure water valve 316 and the boost valve 318. In some embodiments, the valves 316, 318 may be electronic and/or magnetic valves.

When desiring pure water to be output as the treated water 306 at an outlet 324 of the water conditioning system 300, the pure water valve 316 may be switched open and the boost valve 318 may be switched closed. In such operation, the pre-filter staged water will be monitored by a manometer 326 or other pressure sensor and/or transducer and supplied into a reverse osmosis stage 328. The reverse osmosis stage 328 may include a reverse osmosis membrane and/or a nano filtration membrane. The pressurized water will be pushed through the reverse osmosis stage 328, separating out dissolved solids. The output from the reverse osmosis stage 328 is divided into pure water 330 and concentrate 332 (e.g., waste or brine). The concentrate 332 may be disposed over through a waste system 334 including a check valve 336, a flow restrictor 338, and a waste outlet 340.

The pure water 330 will flow along the flow path 302 from the reverse osmosis stage 328 to a post-filter stage 342, such as a deionization resin filter or carbon filter for removing volatile organic compounds and/or a semi-permeable membrane to remove dissolved solids. It will be appreciated that both the pre-filter stage 310 and the post-filter stage 342 may comprise one or more filter stages and/or types of filters, and thus the illustrative schematic configuration is not intended to be limiting, but rather provided for illustrative and explanatory purposes. In some embodiments, the pre-filter stage 310 may be omitted. In some embodiments, the post-filter stage 342 may be a water polishing device. After the pure water is treated within the post-filter stage 342 the water will pass a one-way valve 344 (e.g., non-return valve) to prevent water from flowing in a reverse direction along the flow path 302. The pure water will then pass through a pump control 346 and a TDS meter 348 (total dissolved solids) and dispensed as treated water 306 through the outlet 324.

In an alternative operation, a user can close the pure water valve 316 and open the boost valve 318. In this operation, the feed water 304 is passed through the pre-filter stage 310 and boosted in pressure at the feed pump 314. The pressurized water will then travel directly toward the outlet 324, passing the pump control 346 and the TDS meter 348. The one-way valve 344 prevents the boosted water from traveling in a reverse direction along the flow path 302 toward the post-filter stage 342 of the pure water stages. The boosted pressure water that is dispensed at the outlet 324 is still treated water 306 but has only been treated by the pre-filter stage 310. This water may be dispensed at relatively higher water pressures than the treated water 306 when it passes through the reverse osmosis stage 328 and the post-filter stage 342. This increased water pressure can enable a user to apply pressurized water to hard to reach locations and/or to clean hard surfaces and/or deposits. This high-pressure operation can then be followed by a pure water output of treated water 306 to finalize a cleaning process.

In another alternative operation, a user can use an optional switch to operate a bypass valve 350 arranged between the reverse osmosis stage 328 and the post-filter stage 342. The bypass valve 350 is configured to enable bypassing of the post-filter stage 342 and thus the output (pure water 330) of the reverse osmosis stage 328 may be directed directly to the outlet 324. This can enable the generation of treated water that does not pass through, for example, a polishing filter. This may be useful for high gloss surfaces that do not require low TDS water.

Advantageously, the water conditioning system 300 can provide a boost function to provide a high-pressure water jet on demand. This high-pressure water jet provided when the pure water valve 316 is closed and the boost valve 318 is open can be used for a prewash operation. Such prewash operation may be used to prewash heavy polluted and/or horizontal surfaces as well as for removing cobwebs, dirt, and other materials from hard to reach locations, such as locations that cannot be directly cleaned using a brush or other cleaning implement.

In accordance with some embodiments, and without limitation, when in a pure water cleaning operation, water conditioning systems of the present disclosure may provide pure water at a rate of about 300 liters/hour or less at about 4 bar or less (or about 60 psi or less). When the water conditioning system is switched to boost mode, the output is not pure water but may be suppled at rates of 600 liters/hour or greater at pressures of 5 bar or greater (or about 80 psi or greater). In one non-limiting example, in a pure water mode, the treated water may be dispensed at rates between 100-250 liters/hour and at about 3-4 bar (or at about 40-60 psi) and, in a boost mode, the treated (or non-treated in the case with no pre-filter) water may be dispensed at rates between 900-1,100 liters/hour and at about 7-10 bar (or at about 100-150 psi). When in the pure water operation, a 3-stage filtration may be employed, with a sediment and carbon pre-filter stage (e.g., pre-filter stage 310), a reverse osmosis stage (e.g., reverse osmosis stage 328 having a reverse osmosis membrane and/or a nano filtration membrane), and a deionization polisher (e.g., post-filter stage 342). When configured as shown in FIG. 2, and with the above filtration configuration, the pre-filter stage 310 and the post-filter stage may have easy access for visibility during use and/or enable removability and maintenance thereon.

Figure 4:
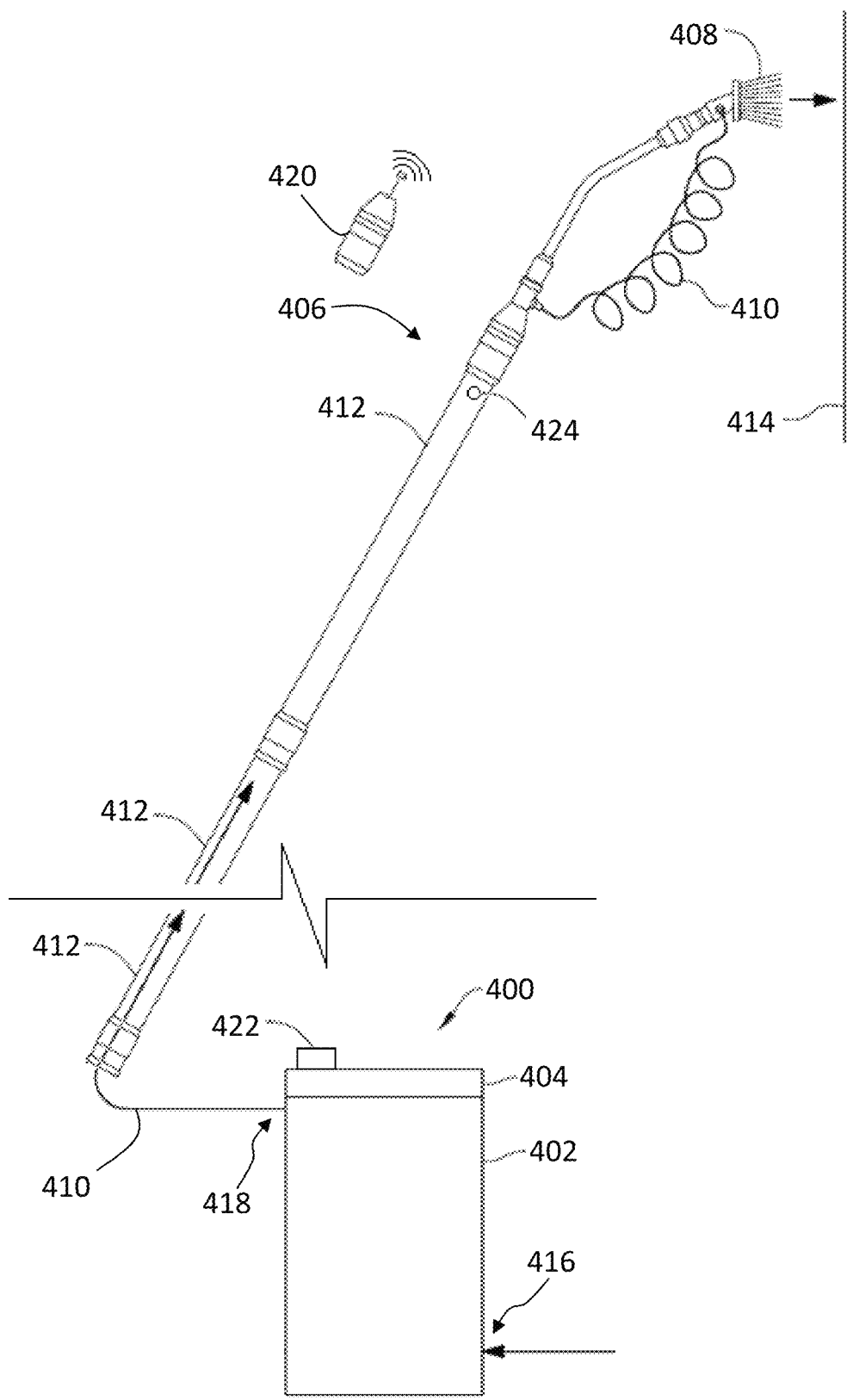
FIG. 4 is a schematic depiction of an embodiment of a water conditioning system according to the present disclosure in use with a water fed cleaning brush on an extension pole.

Referring to FIG. 4, a schematic illustration of a water conditioning system 400 according an embodiment of the present disclosure is shown. The water conditioning system 400 may be similar to that shown and described above, for example, and includes a water conditioner 402 in communication with a controller 404. The controller 404 may be configured to provide an operator with information regarding the performance of the conditioner 402 and/or other aspects of the water conditioning system 400.

The conditioner 402 is in fluid communication with a cleaning implement 406, such as an extendable pole. The cleaning implement 406, as shown, includes a cleaning brush 408 which may be supplied with water from the conditioner 402 via one or more fluid conduits 410 conveyed through pole elements 412 (e.g., telescopic or modular). The fluid conduits 410 within the pole elements 412 may be arranged to deliver conditioned water from the conditioner 402 to the cleaning brush 408 to clean a surface 414. The surface 414 may be a building surface, the ground, a window, solar panels, cars, vehicles, car wash operations, glass production surfaces, and the like, as will be appreciated by those of skill in the art. As such, the surface 414 may be far from the water conditioning system 400, such as due to the reach of the pole elements 412. The water conditioning system 400 may receive water at an inlet 416, treat the water within the water conditioning system 400, and the treated water may exit through an outlet 418. The conditioned water that exits the water conditioning system 400 may past through the fluid conduits 410 and the cleaning implement 406.

Because an operator may be away from the water conditioning system 400, a remote-control device 420 may be used with the water conditioning system 400. For example, the remote-control device 420 may be a wireless handheld device that can communicate with the water conditioning system 400 to provide remote control thereof. As shown in FIG. 4, the water conditioning system 400 may include a receiver 422 that enables electronic control of the water conditioning system 400 by actuation and/or use of the remote-control device 420. Various operations that can be controlled by the remote-control device 420 may include switching between a pure water dispensing and a boost mode, as described above. Another operation may include turning the water conditioning system 400 on or off. The remote-control device 420 may be any wireless device that communicates using a wireless communication protocol (e.g., Wi-Fi, Bluetooth, RF, or the like). In some embodiments, the remote-control device 420 may be a wired device that includes a wired communication connection from the remote-control device 420 to the receive 422.

In some embodiments, and as shown in FIG. 4, the cleaning implement 406 can include an indicator element 424. The indicator element 424 can be a light, a speaker, and/or a haptic feedback device which is configured to generate a notification and/or alarm to notify a user or operator of a predefined condition. For example, the indicator element 424 may be configured to generate an alarm or notification to indicate that a water quality passing through the fluid conduits 410 has dropped below a predetermined or minimum water quality. The sensors to detect such water quality may be arranged along the fluid conduits 410 and/or within the water conditioning system 400 (e.g., sensors 310, 326, and/or 348 shown and described with respect to FIG. 3). In some configurations, once the alert is provided by the indicator element 424, an operator can use the remote-control device 420 to shut the water conditioning system off or change a state of operation (e.g., from pure water mode to boost mode). In some embodiments, the indicator element 424 may be arranged on or part of the remote-control device 420 and/or on the cleaning implement 406. Embodiments in accordance with the present disclosure can include a combination of indicator elements that are integrated into the cleaning element 406, the remote-control device 420, and the controller 404 of the water conditioning system 400, and/or combinations thereof. In some embodiments, the system may be configured to automatically stop operation in the event that a minimum water quality level is not achieved, and the notification can also provide indication of such stoppage. That is, in some embodiments, an auto-shutoff operation may be implemented with the notification.

Advantageously, embodiments of the present disclosure provide improved water conditioning systems. In accordance with some embodiments, the systems may include dual-mode operation having a boost mode with minimally treated water and a pure water mode that has fully treated water that dispenses pure water. The boost mode can use the same pump as the pure water mode, but due to diversion or bypass of the filtering elements of the pure water mode, the water may be dispensed at a relatively high pressure. When the system is changed to a pure water mode, the same pump will cause the water to pass through a reverse osmosis stage and other filters, which will reduce the output water pressure as the increased pressure is required to pass the water through the filtration process. Advantageously, such configuration can simplify the system by using only a single pump rather than two separate, dedicated pumps and/or flow paths. Further, in accordance with some embodiments, remote operation and control of the water conditioning system may be achieved through use of a remote-control device. Further, some systems may include indicators, on a pole, hose, or on the water conditioning system (e.g., display) to alert a user or operator of a change in water quality to be used for cleaning.

As used herein, the terms "about" and "substantially" are intended to include the degree of error associated with measurement of the particular quantity based upon the equipment available at the time of filing the application. For example, "substantially" or "about" can include a range of ±8% or 5%, or 2% of a given value or may refer to deviations from perfect or uniform. Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A water conditioning system, comprising:
a frame;
a water conditioner supported on the frame, the water conditioner having a plurality of conditioning stages arranged along a flow path between an inlet and an outlet, the water conditioner configured to condition water, and the plurality of conditioning stages comprising, in a direction along the flow path, a pre-filter stage, a feed pump, a reverse osmosis stage, and a post-filter stage;
wheels coupled to the frame, the water conditioner and the frame being moveable on the wheels to form a manually moveable unit;
a pure water valve arranged between the feed pump and the reverse osmosis stage;
a boost valve arranged between the feed pump and the outlet,
wherein the pure water valve is configured to selectively allow the water to flow from the feed pump, through the reverse osmosis stage and the post-filter stage, prior to exiting through the outlet, and
wherein the boost valve is configured, in response to a user input, to selectively allow the water to flow from the feed pump directly to the outlet and bypassing the reverse osmosis stage and the post-filter stage, and increase a water pressure at the outlet; and
a handheld cleaning implement fluidly coupled to the manually moveable unit and the handheld cleaning implement including a cleaning brush configured to receive the water from the outlet of the water conditioner,
wherein the handheld cleaning implement is further fluidly coupled to receive the water directly from the boost valve in response to the user input.

2. The water conditioning system of claim 1, further comprising a one-way valve arranged between the post-filter stage and the outlet.

3. The water conditioning system of claim 1, further comprising a water counter arranged between the pre-filter stage and the feed pump.

4. The water conditioning system of claim 1, further comprising a pump control arranged downstream from both the boost valve and the post-filter stage.

5. The water conditioning system of claim 1, further comprising a total dissolved solids sensor arranged just before the outlet along the flow path.

6. A water conditioning system, comprising:
a frame;
a water conditioner supported on the frame, the water conditioner having a plurality of conditioning stages arranged along a flow path between an inlet and an outlet, the water conditioner configured to condition water, and the plurality of conditioning stages comprising, in a direction along the flow path, a pre-filter stage, a feed pump, a reverse osmosis stage, and a post-filter stage;
wheels coupled to the frame, the water conditioner and the frame being moveable on the wheels to form a manually moveable unit;
a pure water valve arranged between the feed pump and the reverse osmosis stage;
a boost valve arranged between the feed pump and the outlet,
wherein the pure water valve is configured to selectively allow the water to flow from the feed pump, through the reverse osmosis stage and the post-filter stage, prior to exiting through the outlet, and
wherein the boost valve is configured, in response to a user input, to selectively allow the water to flow from the feed pump directly to the outlet and bypassing the reverse osmosis stage and the post-filter stage, and increase a water pressure at the outlet; and
a handheld cleaning implement fluidly coupled to the manually moveable unit and the handheld cleaning implement including a cleaning brush configured to receive the water from the outlet of the water conditioner,
wherein the handheld cleaning implement is further fluidly coupled to receive the water directly from the boost valve in response to the user input,
wherein, when the pure water valve is open and the boost valve is closed, treated water is dispensed from the outlet having a rate of 300 liters per hour or less.

7. The water conditioning system of claim 6, wherein the treated water has a pressure of 4 bar or less.

8. A water conditioning system, comprising:
a frame;
a water conditioner supported on the frame, the water conditioner having a plurality of conditioning stages arranged along a flow path between an inlet and an outlet, the water conditioner configured to condition water, and the plurality of conditioning stages comprising, in a direction along the flow path, a pre-filter stage, a feed pump, a reverse osmosis stage, and a post-filter stage;
wheels coupled to the frame, the water conditioner and the frame being moveable on the wheels to form a manually moveable unit;
a pure water valve arranged between the feed pump and the reverse osmosis stage;
a boost valve arranged between the feed pump and the outlet,
wherein the pure water valve is configured to selectively allow the water to flow from the feed pump, through the reverse osmosis stage and the post-filter stage, prior to exiting through the outlet, and
wherein the boost valve is configured, in response to a user input, to selectively allow the water to flow from the feed pump directly to the outlet and bypassing the reverse osmosis stage and the post-filter stage, and increase a water pressure at the outlet; and
a handheld cleaning implement fluidly coupled to the manually moveable unit and the handheld cleaning implement including a cleaning brush configured to receive the water from the outlet of the water conditioner,
wherein the handheld cleaning implement is further fluidly coupled to receive the water directly from the boost valve in response to the user input,
wherein, when the boost valve is open and the pure water valve is closed, treated water is dispensed from the outlet having a rate of 600 liters per hour or greater.

9. The water conditioning system of claim 8, wherein the treated water has a pressure of 6 bar or greater.

10. The water conditioning system of claim 1, wherein the pre-filter stage comprises a sediment and carbon pre-filter.

11. The water conditioning system of claim 1, wherein the reverse osmosis stage comprises at least one of a reverse osmosis membrane and a nano filtration membrane.

12. The water conditioning system of claim 1, wherein the post-filter stage comprises a deionization polisher.

13. The water conditioning system of claim 1, further comprising a switch configured to selectively control operation of the pure water valve and the boost valve.

14. The water conditioning system of claim 13, wherein the switch is at least one of an electronic switch, a mechanical switch, and an electromechanical switch.

15. The water conditioning system of claim 1, further comprising a remote-control device configured to control at least one of an on/off state of the water conditioning system and a boost/pure water operation of the water conditioning system.

16. The water conditioning system of claim 15, wherein the remote-control device is configured to wirelessly communicate or communicate through a wire with a received receiver on the water conditioning system.

17. The water conditioning system of claim 1, wherein the handheld cleaning implement comprises the cleaning brush at an end of a pole.

18. The water conditioning system of claim 1, further comprising an indicator element on the handheld cleaning implement, wherein the indicator element is configured to generate a notification associated with the treated water.

19. The water conditioning system of claim 18, wherein the indicator element is one of a light, a speaker, and a haptic feedback device.

20. The water conditioning system of claim 1, wherein the handheld cleaning implement is a water-fed pole.

21. The water conditioning system of claim 1, wherein the handheld cleaning implement comprises an extendable pole.

22. The water conditioning system of claim 1, further comprising an indicator element configured to generate a notification associated with the water at the outlet of the water conditioner.

23. The water conditioning system of claim 22, wherein the indicator element is part of a remote-control device.

24. The water conditioning system of claim 1, wherein treated water has a pressure of 4 bar or less.

25. The water conditioning system of claim 1, wherein treated water has a pressure of 6 bar or greater.

* * * * *